United States Patent
Howard

(10) Patent No.: US 9,531,555 B2
(45) Date of Patent: *Dec. 27, 2016

(54) APPARATUS AND METHOD FOR TRANSMISSION OF CACHED DATA IN A WIRELESS TELECOMMUNICATIONS SYSTEM

(75) Inventor: Paul Anthony Howard, Bristol (GB)

(73) Assignee: SCA IPLA HOLDINGS INC., New York, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/237,980

(22) PCT Filed: Aug. 13, 2012

(86) PCT No.: PCT/GB2012/051968
§ 371 (c)(1),
(2), (4) Date: Feb. 10, 2014

(87) PCT Pub. No.: WO2013/027021
PCT Pub. Date: Feb. 28, 2013

(65) Prior Publication Data
US 2014/0177512 A1 Jun. 26, 2014

(30) Foreign Application Priority Data
Aug. 19, 2011 (GB) .................. 1114336.9

(51) Int. Cl.
*H04L 12/18* (2006.01)
*H04W 84/04* (2009.01)
(Continued)

(52) U.S. Cl.
CPC ........... *H04L 12/1881* (2013.01); *H04B 7/155* (2013.01); *H04W 84/047* (2013.01); *H04W 88/04* (2013.01)

(58) Field of Classification Search
CPC . H04L 12/1881; H04B 7/155; H04B 7/15592; H04W 84/047; H04W 88/04
See application file for complete search history.

(56) References Cited

U.S. PATENT DOCUMENTS 5,948,070 A * 9/1999 Fujita .................... H04L 12/185
709/200
2007/0275656 A1 * 11/2007 Chang ...................... H04L 1/08
455/9

(Continued)

FOREIGN PATENT DOCUMENTS

CN 101383685 A 3/2009
EP 1 450 535 A1 8/2004

(Continued)

OTHER PUBLICATIONS

3GPP TSG RAN WG1 Meeting #57bis R1-092420 Jun. 29-Jul. 3, 2009 Type-II Relay DL/UL Transmission Schemes Research in Motion, UK Limited.*

(Continued)

*Primary Examiner* — Chi H Pham
*Assistant Examiner* — Weibin Huang
(74) *Attorney, Agent, or Firm* — Oblon, McClelland, Maier & Neustadt, L.L.P.

(57) ABSTRACT

A method and apparatus for transmitting data to terminal devices in a wireless telecommunications system. The data may be user-plane data associated with a repeating Multimedia Broadcast/Multicast Services (MBMS) session to be transmitted using MBMS over a Single Frequency Network (MBSFN) in a network including at least one relay node supported by a donor base station. The method includes delivering the data from the base station to the relay node in advance of a scheduled transmission to terminal devices at a first time, and transmitting the data from the relay node to a terminal device at the first time. The relay node is (Continued)

configured to store the data in a cache. The relay node may then retrieve the data from the cache in advance of a scheduled transmission to terminal devices at a second time, and transmit the retrieved data to a terminal device at the second time.

39 Claims, 3 Drawing Sheets

(51) Int. Cl.
*H04W 88/04* (2009.01)
*H04B 7/155* (2006.01)

(56) References Cited

U.S. PATENT DOCUMENTS

| | | | |
|---|---|---|---|
| 2008/0108304 A1 | 5/2008 | Suga | |
| 2009/0052364 A1* | 2/2009 | Gonsa | H04L 12/189 370/312 |
| 2009/0097433 A1* | 4/2009 | Shen | H04B 7/155 370/315 |
| 2010/0322136 A1* | 12/2010 | Kanazawa | H04L 1/0026 370/312 |
| 2011/0051648 A1 | 3/2011 | Kato | |
| 2011/0158295 A1 | 6/2011 | Shiizaki | |

FOREIGN PATENT DOCUMENTS

| | | |
|---|---|---|
| EP | 1 921 800 A2 | 5/2008 |
| EP | 1 921 800 A3 | 5/2008 |
| EP | 2 234 433 A1 | 9/2010 |
| JP | 10-174185 A | 6/1998 |
| JP | 2009-539299 A | 11/2009 |
| JP | 2010-98508 A | 4/2010 |
| WO | WO 2009/091042 A1 | 7/2009 |

OTHER PUBLICATIONS

U 3GPP TSG RAN WG1 Meeting #57bls R1-092420 Jun. 29-Jul. 3, 2009 Type-II Relay DL/UL Transmission Schemes Research in Motion, UK Limited.*

U.S. Appl. No. 14/239,005, filed Feb. 14, 2014, Howard.
Search Report issued Dec. 16, 2011, in United Kingdom Patent Application No. GB1114336.9.
International Search Report issued Oct. 16, 2012 in PCT/GB2012/051968, filed Aug. 13, 2012.
"Type-II Relay DL/UL Transmission Schemes", Research in Motion, UK Limited, 3GPP TSG RAN WG1 Meeting #57bis R1-092420, XP-050350934, Los Angeles, USA, Jun. 29-Jul. 3, 2009, 8 pages.
"Type II relay for DL cooperative retransmission", ZTE, 3GPP TSG RAN1 #57 R1-091711, XP-050339246, San Francisco, US, May 4-8, 2009, 5 pages.
"Supporting MBMS over relays in Rel10 timeframe", Samsung, 3GPP TSG-RAN WG2 Meeting #71Bis R2-105803, Xian, China, Oct. 11-15, 2010, XP-050452738, 3 pages.
ETSI TS 122 246 V10.0.0 (May 2011), *Technical Specification*, Digital cellular telecommunications system (Phase 2+); Universal Mobile Telecommunications System (UMTS);LTE; Multimedia Broadcast/Multicast Service (MBMS) user services; Stage 1(3GPP TS 22.246 version 10.0.0 Release 10), 19 pages.
ETSI TS 123 246 V10.1.0 (Jun. 2011), *Technical Specification*, Universal Mobile Telecommunications System (UMTS); LTE; Multimedia Broadcast/Multicast Service (MBMS); Architecture and functional description (3GPP TS 23.246 version 10.1.0 Release 10), 67pages.
ETSI TS 125 446 V10.1.0 (Jul. 2011), *Technical Specification*, Universal Mobile Telecommunications System (UMTS); MBMS synchronisation protocol (SYNC) (3GPP TS 25.446 version 10.1.0 Release 10), 24 pages.
Office Action issued Mar. 22, 2016 in United Kingdom Patent Application No. GB1114336.9.
Office Action issued Jun. 16, 2016 in corresponding United Kingdom Application No. GB 1114336.9 (1 page).
Xiaolei Wang et al, "Computer Communications Workshops ( INFOCOM WKSHPS), 2011 IEEE Conference on", IEEE; Apr. 10, 2011; p. 259-264; On the Design of Relay Caching in Cellular Networks for Energy Efficiency; XP031949921A.
Fei Xie et al, "Wireless Communications & Signal Processing, 2009. WCSP 2009. International Conference on"; IEEE; Nov. 13, 2009; p. 1-5; "A Caching-based Video-on-Demand Service in Wireless Relay Networks", XP031594751A.

* cited by examiner

APPARATUS AND METHOD FOR TRANSMISSION OF CACHED DATA IN A WIRELESS TELECOMMUNICATIONS SYSTEM

CROSS-REFERENCE TO RELATED APPLICATIONS

The present application is based on PCT Filing PCT/GB2012/051968 filed 13 Aug. 2012, and claims priority to British Patent Application 1114336.9, filed in the UK IPO on Aug. 19, 2011, the entire contents of each of which being incorporated herein by reference.

BACKGROUND OF THE INVENTION

The present invention relates to methods, systems and apparatus for transmitting data in mobile telecommunication systems.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

To help improve the performance and flexibility of wireless ("mobile") communications systems, relay nodes are proposed to supplement transmissions associated with base stations. Examples of potential performance improvements associated with the use of relay nodes include:

increased coverage of high data rates within a cell
the provision of coverage to new areas
additional features such as temporary network deployments and group mobility.

A relay node maybe considered as being distinct from a conventional cellular base station (e.g. a so-called eNodeB (eNB) in 3GPP LTE nomenclature) in the sense that a relay node is wirelessly connected to the RAN (radio access network) through a conventional base station. The base station through which a relay node connects to the RAN is often referred to a donor base station/donor eNB (i.e. the term donor base station may be used to refer to a base station serving a relay node). The radio network cell supported by the donor eNB in which the relay node is located may similarly be referred a donor cell for the relay node.

Relay nodes may in some respects be categorised according the type of wireless spectrum used for backhaul communications with the donor eNB. For example, "in-band" relay nodes communicate wirelessly with their donor eNB in the same spectrum as is used for communications with terminal devices/user equipment (UEs) within the donor cell, while "out-band" relay nodes communicate wirelessly with their donor eNB using different spectral resources from those used to communicate with UEs in the donor cell.

From a UE's perspective, relay nodes can also be classified into transparent and non-transparent types. For a transparent relay node the UE is unaware that it is communicating with the donor eNB via the relay node. For a non-transparent relay node, on the other hand, the UE is aware that is communicating with the relay node, i.e. the relay node presents to the UE as a conventional eNB.

From the perspective of the donor eNB, a relay node can be considered as simply a functional extension of the donor eNB, in which case the relay node will not have a cell identity of its own and its resources will be controlled by the donor eNB (i.e. at least one part of the Radio Resource Management (RRM) aspect of the Relay Node is controlled by the donor eNB). Alternatively, in some cases a relay node may be considered as serving an independent cell in its own right, in which case the relay node will have its own physical layer cell identity and ownership of the full RRM (i.e. the donor cell does not have control over the relay node's resources).

Relay nodes can also be distinguished from wireless repeaters. The function of a wireless repeater is simply to boost the power of the signals it receives. Wireless repeaters do not discriminate between wanted signal, interference or noise, and will re-broadcast all signal components received. Relay nodes, on the other hand, are regenerative repeaters in the sense that they decode a received signal and selectively re-broadcast appropriate components. Relay nodes can therefore provide for improved signal-to-noise ratios (SNRs), provided a signal is received at the relay node with a sufficient SNR to allow the relay node to decode it successfully.

Thus the deployment of relay nodes in a wireless telecommunications system can provide various different benefits as discussed above. Furthermore, specific deployment scenarios can be designed to promote certain benefits over others. For example, in a deployment where low-cost roll-out is important, an operator may choose to deploy relay nodes to increase the coverage area of each cell without the need to install fully commissioned base stations (including wired backhaul links). In another example, an operator may wish to improve the data rate available to users located in a certain portion of the cell. Installing a relay node can help to achieve this without increasing the total footprint of the cell.

Turning now to some of the types of services that are becoming more common with newer generation telecommunication networks, one such category of services is the Multimedia Broadcast/Multicast Services (MBMS) (see, for example, ETSI TS 122 246 [1]). MBMS services can, for example, include the following user services, as set out in Section 4 of ETSI TS 122 246 [1]:

Streaming services
File download services
Carousel services
Television services

Data transported using the MBMS system is preferentially delivered either via broadcast or multi-cast techniques which allows the same content to be delivered to multiple users simultaneously, thereby saving resources in the physical layer of the radio and wired connections. Point-to-point delivery (unicast) methods may, however, by used in a case where service uptake is low.

The radio physical layer can include a technique for improving the efficiency with which broadcast/multicast services, such as MBMS, can be delivered. This enhancement is referred to as MBMS over a Single Frequency Network (MBSFN). With MBSFN the same waveform is transmitted from all base stations in a defined area at the same time. UEs are then able to combine all signals received no matter which base station they originated from, provided the signals arrive at the UE within a certain time window (signals from different base stations will be received at different times according to how far away they are). A major benefit of MBSFN transmission is an increase in the signal to interference plus noise ratio (SINR) at cell boundaries. The SINR improvement can be obtained because signals from neighbouring base stations are no longer a source of interference, but are an additional source of the wanted signal.

MBMS services are generally designed to be available to all terminal throughout a coverage area. Because of this MBMS data rates will typically be limited by cell-edge performance. Accordingly, when MBSFN transmission is used in the radio physical layer, the system can offer an overall higher throughput throughout the network because the performance at cell boundaries can be improved. This increase in throughput can in turn translate into improved service offerings (e.g. higher definition video, more TV channels, etc.).

However, for MBSFN to be effective, the typical inter-site base station separations distance must be sufficiently small to ensure the single frequency network (SFN) combining can occur at the cell boundaries to provide an improved SINR geometry. If the cells are spaced too sparsely, the system will become noise-limited at the cell boundaries resulting in either service outages or a reduced service capacity across the whole broadcast area, both of which are undesirable.

For operators that wish to deploy MBMS services using MBSFN transmission, relay nodes can offer a cost-effective deployment model for reducing the effective inter-site base station separation. This is because rather than deploying additional fully-equipped base stations, relay nodes could instead be used to enhance signal coverage at the cell boundaries. The operator could then offer an improved level of MBMS service with lower infrastructure cost coming from the lower equipment cost and absence of a separate backhaul connection for the relay nodes.

In view of the above there is a general drive towards the use of relay nodes for transmitting data intended for multiple recipients/UEs in wireless telecommunications systems, for example data associated with MBMS services, and doing so with improved efficiency.

SUMMARY OF THE INVENTION

According to an aspect of the invention there is provided a method of transmitting data to terminal devices in a wireless telecommunications system comprising a base station and a relay node for the base station, the method comprising: transmitting the data from the base station to the relay node; transmitting the data from the relay node to a terminal device at a first time; storing the data in a cache at the relay node; and after having transmitted the data to a terminal device at the first time, retrieving the data from the cache at the relay node and transmitting the data from the relay node to a terminal device at a second time.

In accordance with some embodiments, the data is user plane data associated with a multimedia broadcast multicast service, MBMS.

In accordance with some embodiments, the method further comprises transmitting the data from the base station to a terminal device at a same time as transmitting the data from the relay station to a terminal device. This may be done, for example, using the same physical resource, such as with MBSFN techniques.

In accordance with some embodiments, the method further comprises conveying a cache status indicator from the relay node to the base station to indicate whether the data have been successfully stored in the cache.

In accordance with some embodiments, the method further comprises storing at the base station a record based on the cache status indicator received from the relay node.

In accordance with some embodiments, the method further comprises re-transmitting the data from the base station to the relay node if the relay node does not convey a cache status indicator that indicates the data have been successfully cached at the relay node.

In accordance with some embodiments, the method further comprises associating the data with a data identifier.

In accordance with some embodiments, the data identifier is a MBMS session ID.

In accordance with some embodiments, the step of retrieving the data from the cache and transmitting the data from the relay node to a terminal device at the second time is performed in response to the base station conveying an indication to the relay node indicating the data should be retrieved from the cache and transmitted at the second time.

In accordance with some embodiments, the step of the base station conveying an indication to the relay node indicating the data should be transmitted at the second time is performed by the base station in response to the base station receiving a corresponding session start indicator originating from another network element.

In accordance with some embodiments, the method further comprises associating the data with a session expiry indicator, and wherein the step of retrieving the data from the cache and transmitting the data from the relay node to a terminal device at the second time is conditional on a value of the session expiry indicator.

In accordance with some embodiments, the method further comprises storing synchronisation information associated with the transmission of the data from the relay node to a terminal device at the first time in association with the data stored in the cache, and taking account of the stored synchronisation information when transmitting the data from the relay node to a terminal device at the second time.

In accordance with some embodiments, the method further comprises transmitting synchronisation information to be used for the transmission of the data at the second time from the base station to the relay node.

In accordance with some embodiments, the method further comprises conveying to the relay node an indication of the amount of data to be transmitted.

In accordance with some embodiments, the method further comprises transmitting the data from the base station to a further relay node; transmitting the data from the further relay node to a terminal device at the first time; storing the data in a further cache at the further relay node; and retrieving the data from the further cache and transmitting the data from the further relay node to a terminal device at a second time.

According to an aspect of the invention there is provided a network for transmitting data to terminal devices in a wireless telecommunications system, wherein the network comprises a base station and a relay node for the base station, and the relay node comprises data cache, and wherein the base station is configured to transmit the data to be transmitted from the base station to the relay node and the relay node is configured to transmit the data to a terminal device at a first time and to store the data in the cache, and wherein the relay node is further configured to retrieve the data from the cache after having transmitted the data to a terminal device at the first time and to transmit the data at a second time.

In accordance with some embodiments, the data is user plane data associated with a multimedia broadcast multicast service, MBMS.

In accordance with some embodiments, the base station is configured to transmit the data to a terminal device at a same time as the relay node transmits the data to a terminal device.

In accordance with some embodiments, the relay node is configured to convey a cache status indicator to the base station to indicate whether the data have been successfully stored in the cache.

In accordance with some embodiments, the base station comprises a memory element configured to store a record based on a cache status indicator received from the relay node.

In accordance with some embodiments, the base station is configured to re-transmit the data from the base station to the relay node if the relay node does not convey a cache status indicator that indicates the data have been successfully cached at the relay node.

In accordance with some embodiments, the base station and relay node are configured to associate the data with a data identifier that may be used to identify the data.

In accordance with some embodiments, the data identifier is a MBMS session ID.

In accordance with some embodiments, the relay node is configured to retrieve the data from the cache and transmit the data to a terminal device at the second time in response the base station conveying an indication to the relay node indicating the data should be retrieved from the cache and transmitted at the second time.

In accordance with some embodiments, the base station is configured to convey the indication to the relay node indicating the data should be transmitted at the second time in response to the base station receiving a corresponding session start indicator originating from another network element.

In accordance with some embodiments, the relay node is configured to associate the data with a session expiry indicator and is configured to retrieve the data from the cache and transmit the data to a terminal device at the second time in dependence.

In accordance with some embodiments, the relay node is further configured to store synchronisation information associated with transmission of the data to a terminal device at the first time in association with the data stored in the cache, and is further configured to take account of the stored synchronisation information when transmitting the data to a terminal device at the second time.

In accordance with some embodiments, the base station is configured to transmit synchronisation information to the relay node be used for the transmission of the data at the second time.

In accordance with some embodiments, the base station is configured to transmit to the relay node an indication of the amount of data to be transmitted.

In accordance with some embodiments, the network further comprises a further relay node for the base station, wherein the further relay node comprises a further cache, and wherein the base station is further configured to transmit the data to the further relay node and the further relay node is configured to transmit the data to a terminal device at the first time and to store the data in the further cache, and wherein the further relay node is further configured to retrieve the data from the further cache after having transmitted the data to a terminal device at the first time and to transmit the data at the second time.

According to an aspect of the invention there is provided a method of operating a relay node for a base station for transmitting data to terminal devices in a wireless telecommunications system, the method comprising: receiving the data to be transmitted from the base station; transmitting the data to a terminal device at a first time; storing the data in a cache; and after having transmitted the data to a terminal device at the first time, retrieving the data from the cache and transmitting the data to a terminal device at a second time.

In accordance with some embodiments, the data is user plane data associated with a multimedia broadcast multicast service, MBMS.

In accordance with some embodiments, the method further comprises conveying a cache status indicator to the base station to indicate whether the data have been successfully stored in the cache.

In accordance with some embodiments, the method further comprises receiving a re-transmission of the data from the base station if the relay does not indicate to the base station the data have been successfully cached.

In accordance with some embodiments, the method further comprises associating the data with a data identifier.

In accordance with some embodiments, the data identifier is a MBMS session ID.

In accordance with some embodiments, the step of retrieving the data from the cache and transmitting the data to a terminal device at the second time is performed in response to receiving from the base station an indication indicating the data should be retrieved from the cache and transmitted at the second time.

In accordance with some embodiments, the method further comprises associating the data with a session expiry indicator, and wherein the step of retrieving the data from the cache and transmitting the data to a terminal device at the second time is conditional on a value of the session expiry indicator.

In accordance with some embodiments, the method further comprises storing synchronisation information associated with the transmission of the data to a terminal device at the first time in association with the data stored in the cache, and taking account of the stored synchronisation information when transmitting the data to a terminal device at the second time.

In accordance with some embodiments, the method further comprises receiving synchronisation information from the base station to be used for the transmission of the data at the second time.

In accordance with some embodiments, the method further comprises receiving from the base station an indication of the amount of data to be transmitted.

According to an aspect of the invention there is provided a relay node for transmitting data to terminal devices in a wireless telecommunications system, wherein the relay node comprises a cache and wherein the relay node is configured to receive the data to be transmitted from the base station, to transmit the data to a terminal device at a first time, to store the data in the cache; and after having transmitted the data to a terminal device at the first time, to retrieve the data from the cache and transmit the data to a terminal device at a second time.

In accordance with some embodiments, the data is user plane data associated with a multimedia broadcast multicast service, MBMS.

In accordance with some embodiments, the relay node is configured to convey a cache status indicator to the base station to indicate whether the data have been successfully stored in the cache.

In accordance with some embodiments, the relay node is configured to receive a re-transmission of the data from the base station if relay node does not indicate to the base station the data have been successfully cached.

In accordance with some embodiments, the relay node is configured to associate the data with a data identifier.

In accordance with some embodiments, the data identifier is a MBMS session ID.

In accordance with some embodiments, the relay node is configured to retrieve the data from the cache and transmit the data to a terminal device at the second time in response to receiving from the base station an indication indicating the data should be retrieved from the cache and transmitted at the second time.

In accordance with some embodiments, the relay node is configured to associate the data with a session expiry indicator, and to retrieve the data from the cache and transmit the data to a terminal device at the second time in dependence on a value of the session expiry indicator.

In accordance with some embodiments, the relay node is configured to store synchronisation information associated with the transmission of the data to a terminal device at the first time in association with the data stored in the cache, and to take account of the stored synchronisation information when transmitting the data to a terminal device at the second time.

In accordance with some embodiments, the relay node is configured to receive synchronisation information from the base station to be used for the transmission of the data at the second time.

In accordance with some embodiments, the relay node is configured to receive from the base station an indication of the amount of data to be transmitted.

According to an aspect of the invention there is provided a method of operating a base station to control the transmission of data to terminal devices in a wireless telecommunications system by a relay node for the base station, the method comprising: transmitting the data to the relay node for transmission by the relay node to a terminal device at a first time; conveying an indication to the relay node to indicate the relay node should attempt to store the data in a cache at the relay node; and subsequently conveying an indication to the relay node to indicate the relay node should retrieve the data from the cache and transmit the data to a terminal device at a second time.

In accordance with some embodiments, the data is user plane data associated with a multimedia broadcast multicast service, MBMS.

In accordance with some embodiments, the method further comprises transmitting the data from the base station to a terminal device at the first and/or second time.

In accordance with some embodiments, the method further comprises receiving a cache status indicator from the relay node to indicate whether the data have been successfully stored in the cache at the relay node.

In accordance with some embodiments, the method further comprises further storing a record based on the cache status indicator received from the relay node.

In accordance with some embodiments, the method further comprises re-transmitting the data to the relay node if a cache status indicator which indicates the data have been successfully cached at the relay node is not received.

In accordance with some embodiments, the method further comprises associating the data with a data identifier.

In accordance with some embodiments, the data identifier is a MBMS session ID.

In accordance with some embodiments, the step of conveying an indication to the relay node to indicate the data should be transmitted at the second time is performed in response to the base station receiving a corresponding session start indicator originating from another network element.

In accordance with some embodiments, the method further comprises associating the data with a session expiry indicator, and wherein the step of conveying an indication to the relay node to indicate the relay node should retrieve the data from the cache and transmit the data to a terminal device at a second time is conditional on a value of the session expiry indicator.

In accordance with some embodiments, the method further comprises transmitting synchronisation information to be used for the transmission of the data at the second time to the relay node.

In accordance with some embodiments, the method further comprises conveying to the relay node an indication of the amount of data to be transmitted.

In accordance with some embodiments, the method further comprises transmitting the data to a further relay node for transmission by the further relay node to a terminal device at the first time; conveying an indication to the further relay node to indicate the further relay node should attempt to store the data in a further cache at the further relay node; and subsequently conveying an indication to the further relay node to indicate the further relay node should retrieve the data from the further cache and transmit the data to a terminal device at the second time.

According to an aspect of the invention there is provided a base station for controlling the transmission of data to terminal devices in a wireless telecommunications system by a relay node for the base station, wherein the base station is configured to transmit the data to the relay node for transmission by the relay node to a terminal device at a first time; convey an indication to the relay node to indicate the relay node should attempt to store the data in a cache at the relay node; and to subsequently convey an indication to the relay node to indicate the relay node should retrieve the data from the cache and transmit the data to a terminal device at a second time.

In accordance with some embodiments, the data is user plane data associated with a multimedia broadcast multicast service, MBMS.

In accordance with some embodiments, the base station is configured to transmit the data to a terminal device at the first and/or second time.

In accordance with some embodiments, the base station is configured to transmit receive a cache status indicator from the relay node to indicate whether the data have been successfully stored in the cache at the relay node.

In accordance with some embodiments, the base station comprises a memory element configured to store a record based on a cache status indicator received from the relay node.

In accordance with some embodiments, the base station is configured to re-transmit the data to the relay node if the base station does not receive a cache status indicator which indicates the data have been successfully cached at the relay node.

In accordance with some embodiments, the base station is configured to associate the data with a data identifier that may be used to identify the data.

In accordance with some embodiments, the data identifier is a MBMS session ID.

In accordance with some embodiments, the base station is configured to convey the indication to the relay node indicating the data should be transmitted at the second time in response to the base station receiving a corresponding session start indicator originating from another network element.

In accordance with some embodiments, the base station is configured to associate the data with a session expiry indicator, and wherein the step of conveying an indication to the relay node to indicate the relay node should retrieve the data from the cache and transmit the data to a terminal device at a second time is conditional on a value of the session expiry indicator.

In accordance with some embodiments, the base station is configured to transmit synchronisation information to the relay node be used for the transmission of the data at the second time.

In accordance with some embodiments, the base station is configured to transmit to the relay node an indication of the amount of data to be transmitted.

In accordance with some embodiments, the base station is further configured to transmit the data to a further relay node for transmission by the further relay node to a terminal device at the first time; to convey an indication to the further relay node to indicate the further relay node should attempt to store the data in a further cache at the further relay node; and to subsequently convey an indication to the further relay node to indicate the further relay node should retrieve the data from the further cache and transmit the data to a terminal device at the second time.

It will be appreciated that features and aspects of the invention described above in relation to the first aspects of the invention are equally applicable and may be combined with other aspects of the invention as appropriate.

BRIEF DESCRIPTION OF DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
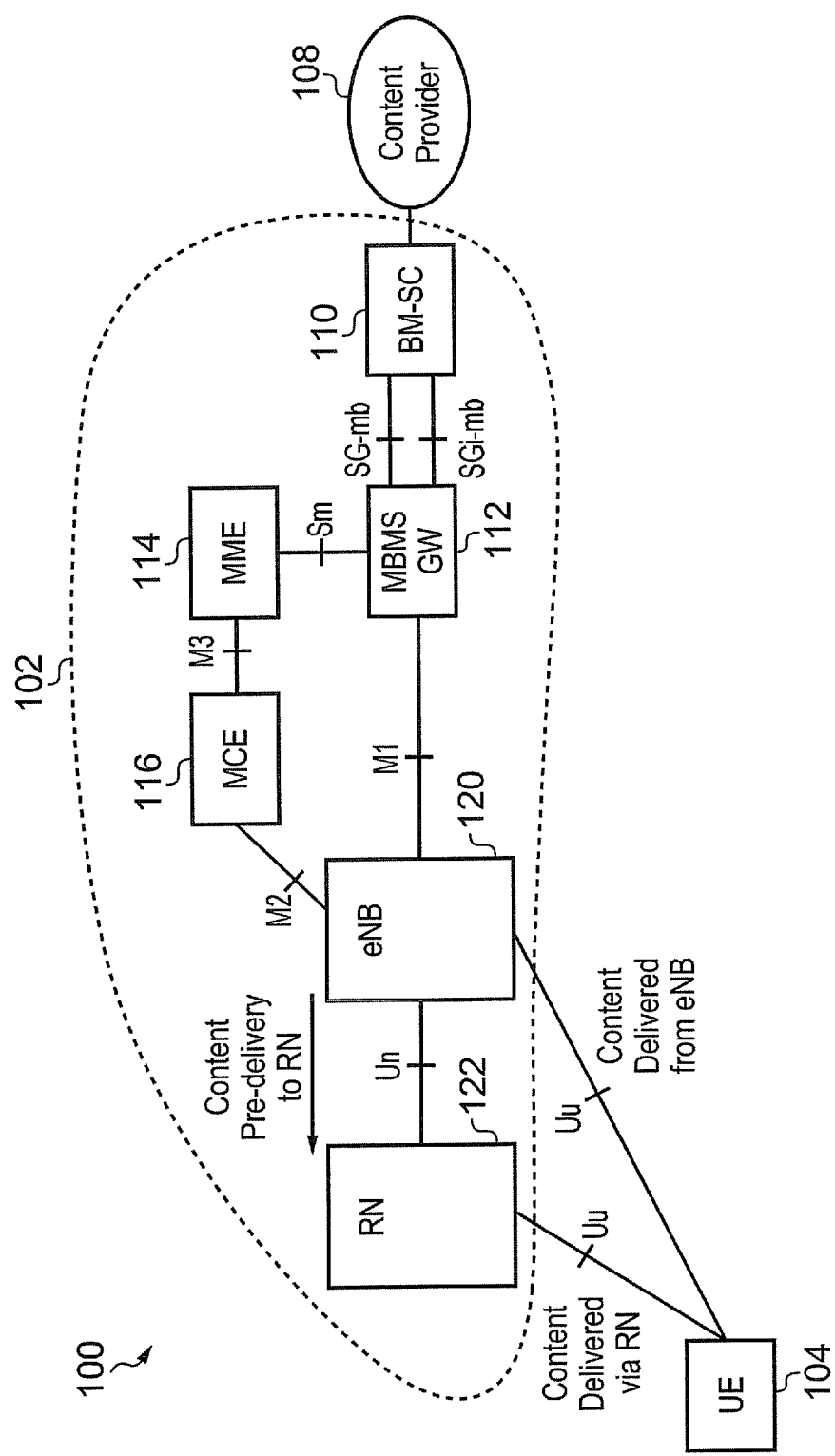
FIG. 1 schematically shows some aspects of a conventional wireless telecommunications system employing Multimedia Broadcast/Multicast Services over a Single Frequency Network (MBSFN) using a relay node.

FIG. 1 schematically shows some aspects of a conventional wireless telecommunications system 100 supporting Multimedia Broadcast/Multicast Services over a Single Frequency Network (MBSFN) techniques. The system 100 in this example is considered to be generally 3GPP LTE compliant such that the various elements comply with the relevant 3GPP LTE standards to the extent these are defined.

The system 100 comprises a network component 102, a terminal device/user equipment (UE) 104, and a content provider 108 for providing multimedia content to the network 102 for broadcast to the terminal device 104. In general there will of course be a plurality of UEs being served by the network 102. The content provider may, for example, be an independent news service provider arranged to supply media contents to subscribers' UEs using the network 102 in a conventional manner. It will be appreciated there will be many other elements of the system 100, and in particular elements of the network component 102, that are not shown in FIG. 1 for simplicity, for example because they are not directly related to the MBMS aspects of the network.

The network 102 part of the system 100 comprises a Broadcast/Multicast Service Centre (BM-SC) 110, an MBMS gateway 112, a Mobility Management Entity (MME) 114, a Multi-cell/multicast Coordination Entity (MCE) 116, a base station/eNB 120 and a relay node (RN) 122. In general a network of the kind shown in FIG. 1 will of course normally comprise multiple base stations/eNBs serving multiple cells, but these are not shown for simplicity. Furthermore, the network may also comprise multiple relay nodes, either in association with other base stations and/or in association with the base station 120.

The operation of the various elements shown in FIG. 1 will be understood and is as defined in the relevant 3GPP standards and so not all aspects of the system's functionality are described in detail here in the interests of brevity. Thus, in accordance with established techniques, media content provided by the content provider 108 for broadcast/multicast to (at least) the UE 104 is routed through the network 102 to the base station 120 for onward wireless transmission. For MBSFN including relay nodes, the media content is also passed to the relay node 122 for onward transmission. Furthermore, because MBSFN relies on simultaneous broadcast by all partaking transmission nodes (i.e. both base stations and relay nodes), the media content for broadcast/multicast must be communicated to the relay node 122 in advance of the MBSFN transmission.

The transmission of the media content from the base station 120 to the relay node 122 is made over the wireless Un interface. This is schematically indicated in FIG. 1 by the arrow between the base station 120 and the relay node 122 marked "Content Pre-delivery to RN". Once the media content has been transferred to the relay node, the network 102 is in a position to deliver the content to the UE 104 (and any other UEs authorised to receive the content) using MBSFN with simultaneous transmission from the base station 120 and relay node 122 (and any other transmission nodes) over their respective wireless Uu interfaces.

Thus, as schematically shown in FIG. 1, the UE 104 is able to receive the media content from the base station 120 over the Uu interface narked "Content Delivered from eNB" and from the relay node 122 over the Uu interface narked "Content Delivered via RN". The UE 104 is schematically shown as being further from the base station 120 than from the relay node 122. In combining data from both the base station 120 and the relay node 122, the UE 104 is able to receive a higher quality signal than would be the case if only the base station 120 were used to transmit the data, which gives rise to the various advantages discussed above.

One drawback of the conventional MBSFN with relay node transmission approach described above with reference to FIG. 1 relates to the provision of backhaul to the relay node 122 over the Un interface. In particular, the need to pre-deliver the content to the relay node 122 before MBSFN transmission involving the relay node can commence means the donor base station (eNB) 120 must in effect transmit the MB SFN data twice, once to the relay node(s), and once again as part of the MBSFN transmission (which the relay node(s) take part in). This double transmission represents an inefficiency with this deployment model, especially for in-band relay nodes as the pre-delivery of content to the relay node(s) 122 reduces the available transmission resources that can otherwise be used by the donor base station 120 to serve UEs in the cell.

For some MBMS user services, for example streaming services, it is expected the service content data may be continuous and non-repetitive (e.g. live video broadcasts). However, the inventors have recognized for some other types of service, such as file download or carousel services, the content data may be transmitted repeatedly, for example according to a defined schedule. The inventors have further recognized that in these cases it can be possible to reduce traffic on the interface between a base station and a relay node by storing/caching content data at the relay node when it is received from a base station for a first transmission, and then using the stored data as the source for subsequent transmissions instead of re-receiving the content data wirelessly from the base station.

That is to say, by providing a relay node with sufficient storage, it can be possible to cache content data for some MBMS sessions and replay it from the cache for subsequent transmission(s), for example, according to a programme schedule. If content has been stored on the relay node in this way, the content does not need to be communicated to the relay node every time it is re-broadcast, thus saving resources on the backhaul (Un) link between the base station and relay node. A network can therefore assign less of the donor cell's resources to the Un link, thereby freeing up resources for other purposes and improving the overall efficiency of the network.

Figure 2:
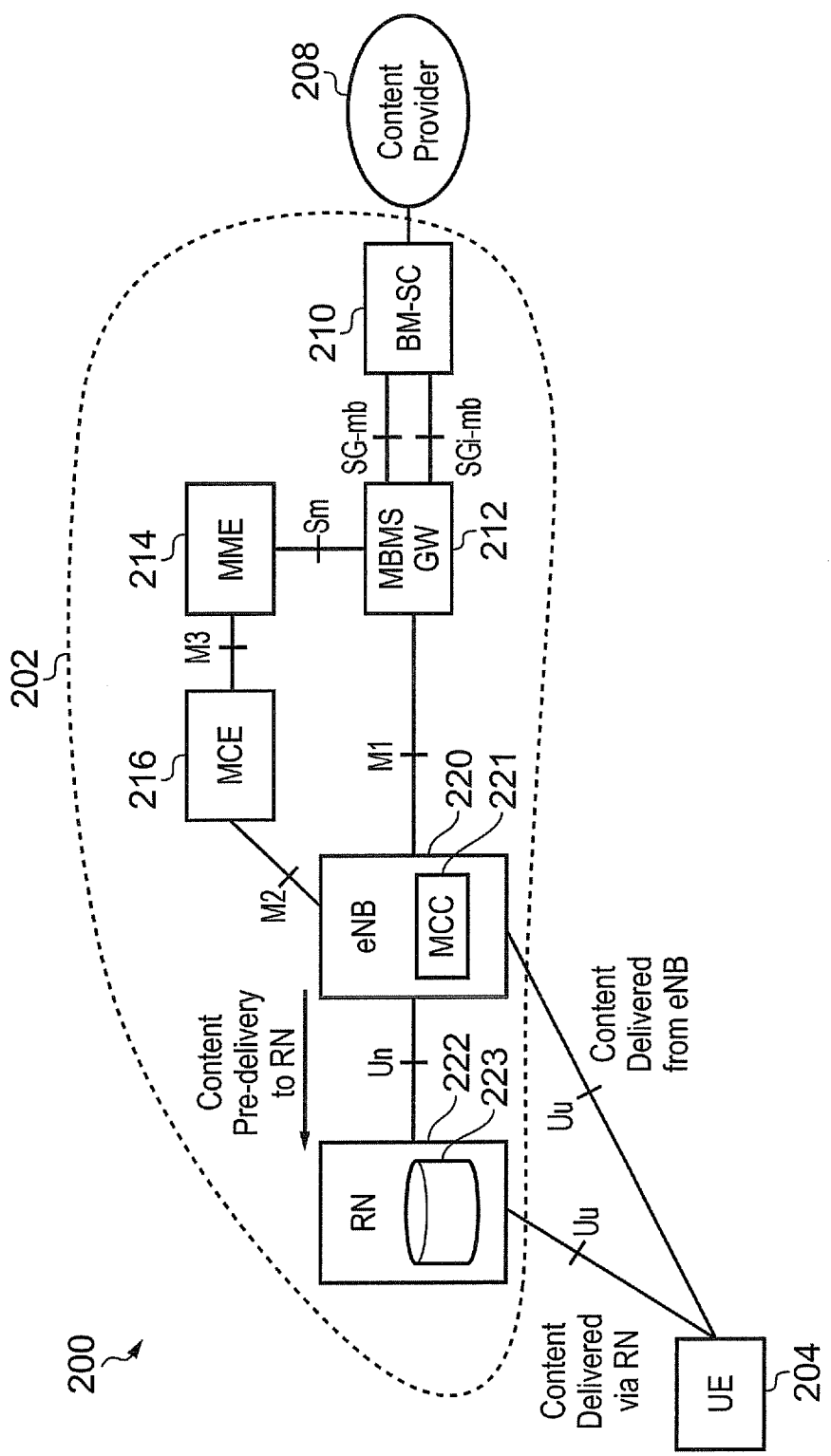
FIG. 2 schematically shows aspects of a wireless telecommunications system employing MBSFN in conjunction with a relay node in a first stage of operation according to an embodiment of the invention.
Figure 3:
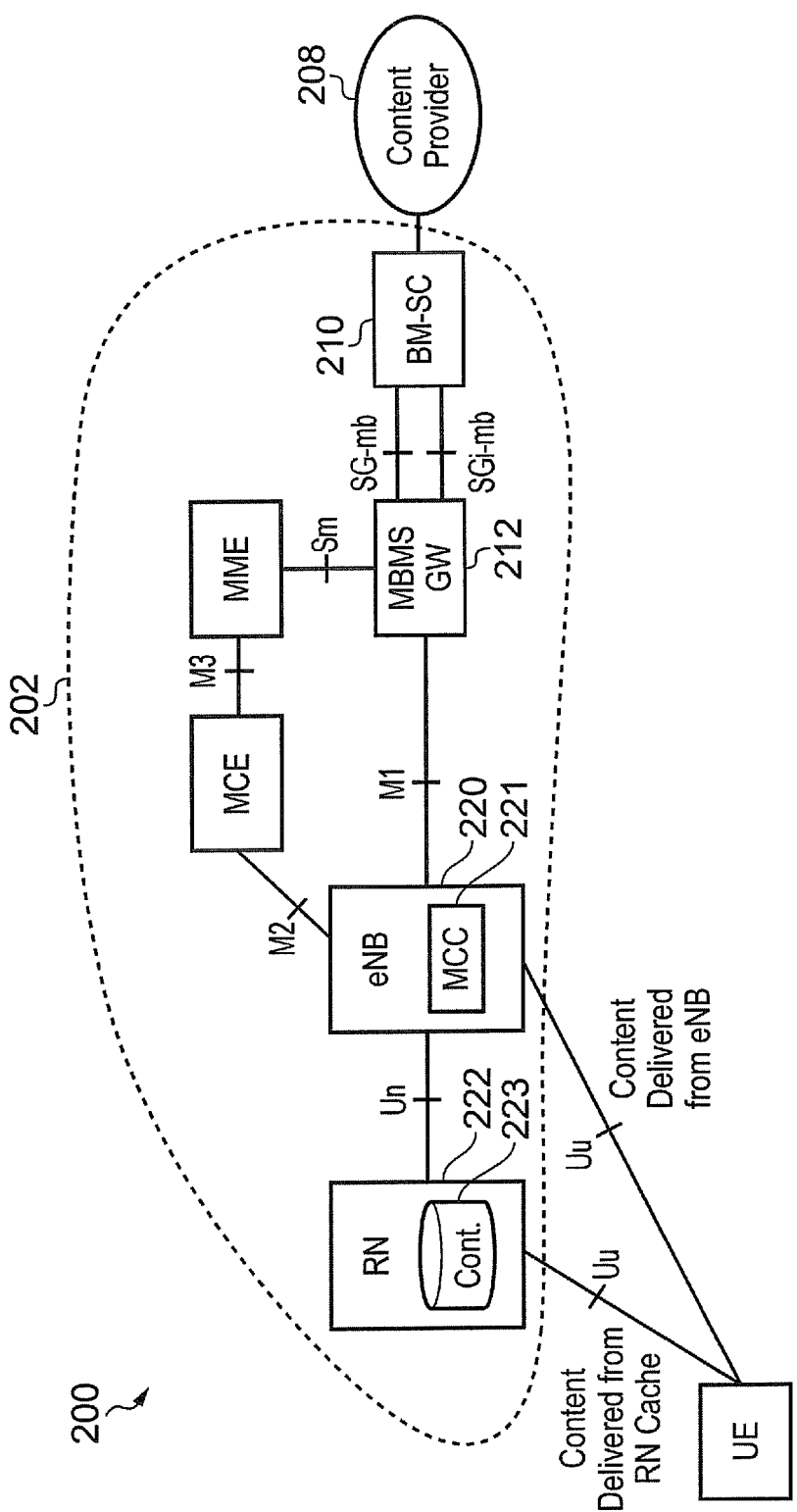
FIG. 3 schematically shows aspects of the wireless telecommunications system of FIG. 2 employing MBSFN in conjunction with a relay node in a second stage of operation according to an embodiment of the invention.

FIGS. 2 and 3 schematically shows some aspects of a wireless telecommunications system 200 supporting Multimedia Broadcast/Multicast Services over a Single Frequency Network (MBSFN) techniques in accordance with an embodiment of the invention at different operating stages. The system 200 in this example is considered to be generally 3GPP LTE compliant such that the various elements comply with the relevant 3GPP LTE standards to the extent these are defined, except where modified to implement the below-described embodiment of the invention. In this regard aspects of the wireless telecommunications system 200 shown in FIGS. 2 and 3 which are not specifically described or indicated as being non-conventional may be provided in accordance with established practices for the relevant elements, for example, corresponding to those elements represented in FIG. 1.

The system 200 of FIGS. 2 and 3 comprises a network component 202, a terminal device/user equipment (UE) 204, and a content provider 208 for providing multimedia content to the network 202 ad intended for repeat broadcasting. In general there will of course be a plurality of UEs being served by the network 202. The content provider may, for example, be an independent news service provider arranged to supply media contents to subscribers' UEs over using the network 202, for example, a repeating news programme. It will be appreciated there will be many other elements of the system 200, and in particular elements of the network component 202, that are not shown in FIG. 2 for simplicity, for example because they are not directly related to the implementation of this embodiment of the invention.

The network 202 part of the system 200 comprises a Broadcast/Multicast Service Centre (BM-SC) 210, an MBMS gateway 212, a Mobility Management Entity (MME) 214, a Multi-cell/multicast Coordination Entity (MCE) 216, a base station/eNB 220 and a relay node (RN) 222. Unlike the example shown in FIG. 1, the relay node 222 of FIGS. 2 and 3 comprises a cache 223 for storing data content for broadcast, and the base station 220 incorporates a new functional unit referred to hear as an MBMS cache controller (MCC) 221. The operating functionality of the MCC 221 in implementing an embodiment of the invention in conjunction with the relay node cache 223 is described further below.

As is conventional, the base station 220 may comprise a transceiver unit for transmission and reception of wireless signals and a controller unit configured to control the base station to operate as desired according to the principles described herein. As is conventional, the relay node 222 may similarly comprise a transceiver unit for transmission and reception of wireless signals and a controller unit configured to control the relay node to operate as desired according to the principles described herein. As is also conventional, the terminal device 204 may comprise a transceiver unit for transmission and reception of wireless signals and a controller unit configured to control the terminal device. For example, the respective controller units of the base station, relay node and terminal device may comprise respective processor units which are suitably configured/programmed to provide the desired functionality using conventional programming/configuration techniques for equipment in wireless telecommunications systems.

In general, and as with FIG. 1, a network of the kind shown in FIGS. 2 and 3 will of course normally comprise multiple base stations/eNBs serving multiple cells, but these are not shown for simplicity. Furthermore, the network may also comprise multiple relay nodes, either in association with other base stations and/or in association with the base station 220.

The operation various aspects of the elements shown in FIGS. 2 and 3 which are conventional will be understood from the relevant 3GPP standards and are not described in detail here in the interests of brevity.

As noted above, the inventors have recognized that caching repeated services at a relay node can realise efficiency savings by removing the requirement to re-transmit repeated MBMS sessions to relay nodes. In this regard FIG. 2 schematically represents a first operating mode where data is transmitted by the network 200 for a first time while FIG. 3 schematically represents a second operating mode where data is transmitted by the network 200 for a second time (or any subsequent time). The operating mode of FIG. 2 corresponding to the transmission of data for the first time has some similarities with the approach of FIG. 1 in that the data are pre-delivered from the base station 220 to the relay node 222 for subsequent simultaneous transmission by the base station(s) and relay node(s) in the network. However, unlike the conventional approach of FIG. 1, the relay node is configured to store the data in the cache 223. In addition, the MCC 221 of the base station is configured to keep track of what data have been stored in the cache 223 of the relay node 222 (and in corresponding caches of any other relay nodes served by the base station 220). The operating mode of FIG. 3 corresponding to the transmission of data for the second (and each subsequent) time is different. In particular, when the data are repeat transmitted, there is no need for the data to be pre-delivered from the base station 220 to the relay node 222 for subsequent simultaneous transmission by the base station(s) and relay node(s) in the network. Instead, all the base station 220 may simply send a message to the relay node 222 to indicate that the previously stored data should be retrieved from the cache 223 for transmission at an indicated time.

Caching in this way in accordance with embodiments of the invention may thus be applicable to MBMS Sessions that may be repeated. Currently MBMS services in accordance with the relevant standards allows for sessions to be repeated, but this is generally limited to the download delivery method rather than the streaming delivery method.

Streaming delivery is generally intended for real-time delivery via conventional broadcast methods. Consumption is intended to be 'live', although content is often stored in a receiving terminal device for use (e.g. viewing) at a later time. In order to receive streaming content, the receiver must be active at the specific time that a broadcast is made. If the receiver is not active or out of coverage, then the session can not be received.

Download delivery, on the other hand, is intended for non-real-time delivery applications where the content is meant to be consumed off-line. Examples include software and media downloads for applications such as books, audio and video clips. As the download delivery method is primarily intended to be an off-line mechanism, download sessions may be repeated a number of times in a given download window, for example to improve the probability that a terminal interested in a specific download session will be able to receive it.

In order to allow for repeated sessions in this way, the current 3GPP specifications provide for an (optional) MBMS Session ID to be included in a conventional Session Start Announcement for download delivery sessions. The session ID may thus be used by a terminal device to recognise session subject to repeated transmissions. If the terminal device has previously successfully received a session with the same session ID, then it does not need to activate its receiver and can remain idle, conserving power in the process. Obviously, if the terminal device cannot match the Session ID and is interested in the service being announced, it can activate its receiver and receive the session.

To allow for a finite number of session IDs, a second information element, MBMS Session ID Expiry is also provided in accordance with conventional MBMS schemes. The session ID expiry allows for individual session IDs to be assigned to new MBMS Sessions once the original session has expired.

The inventors have recognized that established session ID identifiers can be used to manage the caching of data for repeated transmissions in accordance with embodiments of the invention. The repeated transmissions may, for example, be repeated transmissions of data in a download delivery context. Furthermore, the inventors have recognized this general framework may also be extended to streaming service MBMS sessions which are subject to repeat, for example, for streaming news bulletins on a repeating cycle. Thus in accordance with some embodiments of the invention a the presence of the optional MBMS Session ID information element in association with a given MBMS transmission may be used as an implicit indication that the MBMS Session may be repeated, and as such may be cached by a relay node(s).

Having described some of the general concepts associated with embodiments of the invention, some further details of elements of FIGS. 2 and 3 are summarised. It will be appreciated that many of the operational aspects of embodiments of the invention parallel corresponding operational aspects of conventional MBMS data delivery, e.g. as in FIG. 1.

Thus the BM-SC 210 is the element that controls the delivery of MBMS sessions. That is to say, content (data) for transmission is provided to the BM-SC 210 by the content provider, and the BM-SC 210 is responsible for, amongst other things, service announcement and content synchronization associated with the transmission. The content provider 208 will be aware of whether the data is to be subject to repeated transmission (in the same or in separate sessions), and makes this information available to the BM-SC 210. Thus content provider(s) 208 provides data (e.g. files) for transmission with an associated indication of whether the data are to be repeatedly broadcast to the BM-SC 210, and the BM-SC 210 oversees the delivery of the content (data) through the core network and radio access network aspects of the network 202. The BM-SC 210 compiles an electronic program guide (EPG) and creates the necessary control plane messages announcing the start of MBMS sessions to network elements. User plane data for transmission is encapsulated in a SYNC protocol and is distributed through the network 202, for example using established IP multicast techniques. The SYNC protocol is terminated in the base station 220 and in the relay node 222 and is used to synchronise physical layer transmissions across multiple base stations (and relay nodes) for transmissions in a MBSFN area.

The BM-SC 210 announces MBMS Sessions in an MBMS Session Start Procedure with the MBMS-GW 212. The control plane interface between the BM-SC 210 and MBMS-GW 212 is the SG-mb interface and it uses the Diameter Protocol. Part of the conventional MBMS session start message format contains an information element for the MBMS Session identity and its repeat number. In accordance with some embodiments of the invention this information is supplemented by including an information element for the MBMS Session Identity Expiry. Including this extra information element in the session start message can help make the relevant information available to network elements at appropriate layers of the OSI model. Conventionally, session identity expiry information is present in a File Delivery Table (FDT) of a FLUTE session. FLUTE is defined by the IETF in RFC3926 and is a protocol used for file delivery over unidirectional transport, such as broadcast. In some situations it may not be considered efficient for all network elements to inspect the FDT for FLUTE sessions in order to extract information about session ID expiry, in which case its inclusion in an MBMS Session Start procedure can be helpful.

Thus MBMS-GW 212 receives a session start message from the BM-SC 210. The MBMS-GW 212 creates a MBMS-Bearer context to store the MBMS Session attributes. The MBMS-GW 212 then prepares downstream control-plane nodes for the upcoming MBMS session. This begins by the MBMS-GW 212 sending a session start request to the MME 214 over the Sm interface. This interface is based on GTPv2-C. The standard session start request defined for this interface includes the MBMS Session Identity as a conditional information element which is populated if a session identity is provided by the BM-SC 210. The contents of this message may also be extended in some embodiments in a similar way as for the sessions start message provided by the BM-SC 210 over the SGmb interface, i.e. by the inclusion of an MBMS Session Identity expiry information element. This field may also by conditionally present and populated if the information is provided by the BM-SC 210.

The MME 214 is responsible for forwarding control plane messages on to the MCE 216 over the M3 interface. The protocol used is M3AP (M3 Application Part). The MME 214 forwards a MBMS Session Start Request message to the MCE(s) 216. Once again, the MBMS Session Identity can be included in the message for download sessions to permit other elements in the network to recognise sessions that may be subject to repeated transmissions. To enable caching to operate at the relay node 222 in accordance with an embodiment of the invention, the session identity is included in the message. The session identity expiry indicator may also be included to allow for re-use of session ID numbers without subsequent network nodes accessing the FDT.

The MCE 216 is responsible for setting up access nodes under its control, for example the donor base station 220 and any other eNodeBs/donor eNode Bs for relay nodes for which the MCE 216 is responsible. The MCE(s) 216 may be unaware of the use of relay nodes, in which case the donor base station 220 may be responsible for controlling the routing of relevant control plane (and user plane) traffic onto the relay nodes. The MCE 216 communicates the donor base station 220 over the M2 interface. The protocol used is M2AP (M2 Application Part). The MCE 216 is responsible for instructing the base station 220 to reserve physical resources for the MBMS Sessions in parallel with any other (donor) base stations which are to be involved in the MBMS Session transmission. The same physical channels are used across multiple access elements (i.e. base stations and relay nodes) to permit MBSFN transmission. In order to make the MBMS Cache controller 221 in the base station 220 aware of the MBMS Session Identity and its associated MBMS Session Identity Expiry value, these information elements are conveyed with the MBMS Session Start Request message used over the M2 interface.

The MBMS Cache controller 221 in this example resides in the donor base station 220. The MCC 221 is responsible for forwarding M2 control plane messages to the relay node(s) 222 under the supervision of the donor base station. This interface is referred to here as the M2' (M2 prime) interface and is carried by the Un physical interface. The relay node 222 receiving the M2' control plane messages is configured to distinguish new MBMS Sessions (first transmission) and repeated MBMS Sessions (second and subsequent transmissions) by extracting the MBMS Session Identity and MBMS Session Identity Expiry information elements from MBMS Session Start Request messages.

User plane data is delivered from the BM-SC 210 over the SGi-mb interface to the MBMS-GW 212. The MBMS-GW 212 forwards the data on to the access nodes (i.e., base station 220 in FIGS. 2 and 3) over the M1 interface. When a new MBMS Session is identified (based on the Session ID/repeat number), the MBMS Cache Controller 221 in the base station forwards the SYNC-encapsulated data to all relay nodes under its supervision, potentially using multicast or unicast techniques over the Un interface. This is schematically indicated in FIG. 2 by the arrow between the base station/eNB 220 to the relay node 222 marked "Content pre-delivery to RN". The relay node 222 reads the MBMS Session ID and Expiry information associated with the new MBMS service and stores the user-plane data in the cache 223 as it is received at the relay node 222. It may be noted that a SYNC protocol can be configured to allow time for the data to be pre-delivered to the furthest network node, for example the relay node 22 in this example, but there is no need for the entire set of data associated with a transmission to be delivered to the relay before MBSFN transmission can begin. Typically a pre-delivery time may be on the order of 10s to 100s of milliseconds in advance of a desired MBSFN transmission. That is to say, the elements of the data may be pre-delivered on a "just in time" type basis.

The end of a MBMS Session is indicated by a session stop request message. This traverses the same control plane interface path as the session start message described above (BM-SC 210 to MME 214 to MCE 216 to base station 220 to relay node 222). Relay nodes under the supervision of a donor base station respond by sending a MBMS Session Stop Response. In order to inform the MBMS Cache controller 221 in the base station 220 that the relay node 222 has successfully cached the user-plane data, an additional information element may be added to the MBMS Session Stop Response message carried over the M2' interface. This information element may be referred to here as a Cache Status Indicator.

The MBMS Cache controller 221 keeps context information for each MBMS Session ID in which is recorded the Cache Status Indicator for the corresponding Session ID as reported by each relay node under the control of the base station. In normal operation, each relay node 222 will return a Cache Status Indicator that indicates the data have been successfully received and cached.

When a session is subsequently repeated, a new session start request will be issued from the BM-SC 210. When this arrives at the donor base station 220 (following the same path as described above), the MBMS Cache Controller 220 will look up the recorded context for the corresponding session ID. If all relay nodes for which the base station 220 acts as a donor base station returned successful cache indications following a previous transmission of the data associated with the particular Session ID, and the corresponding Sessions Expiry value does not indicate the Session ID has expired, the MBMS Cache Controller 220 can thus determine there is no need to forward user-plane data associated with the repeated session ID to the relay node(s) 220 over the Un interface. However, if one or more relay nodes returned an unsuccessful cache indication (e.g. a Cache Status Indicator that indicates the data were not successfully received and cached or no Cache Status Indicator at all), the MBMS Cache Controller 220 can decide to forward the user-plane data associated with the repeated session ID to the relay node(s) indicating they have not cached the data (assuming it is desired for these relay nodes to be involved in a subsequent transmission of the data from the network 202 to the terminal device(s) 204). This may be done in a multicast or unicast manner.

If the Session ID expiry value associated with the Session ID is invalid, the session may be treated as a new session (e.g. because it is assumed the Session ID is being re-used for a different session rather than for a repeated transmission).

The relay node 220 will itself also be aware if it has successfully cached the user plane data for a given MBMS Session ID. Thus, when the relay node 222 receives a session start request with a MBMS Session ID (indicating a potential repeat), the relay node 222 makes a check to see if it has cached data for this Session ID in its cache 223, and may also check to see if the Session Expiry Indicator is valid. If these checks are successful (i.e. it is determined the Session ID is still valid for a previously received and cached session transmission), then the relay node may "replay" the user plane data for transmission to a UE from its cache, instead of from a received channel from the base station 220. This is schematically represented in FIG. 3 by the caption "Content delivered from RN cache" adjacent the interface between the relay node 222 and terminal device 204. If the relay node 220 determines the session ID is new or has expired, then the relay node 220 will read the user plane data forwarded over the Un interface and attempts to store the data in its cache in the manner described above for an initial transmission.

For the case shown in FIG. 3 where a repeat transmission is made from the relay node's cache 223, it may be helpful to ensure the user plane data is replayed from the cache 223 and transmitted on the relevant physical channels from the relay node to a receiving terminal device 204 synchronously with transmissions of the data from other access nodes (e.g. base station 220 shown in FIG. 3, and any other base stations and relay nodes involved in the transmission). To do this, the relay node 222 may cache the user-plane data at the SYNC protocol layer. When the data is replayed for a subsequent transmission, the stored SYNC protocol data can thus be used to provide for synchronisation on the physical layer between the relay node and other access nodes. To support this approach the BM-SC 210 can be configured to use the same SYNC headers for repeated transmissions of the same data. Since the SYNC header is under the control of the BM-SC 210 and is based on relative timing (the BM-SC operation is not sensitive to any aspects of the wireless physical layer structure), this approach to synchronisation can be easy to implement.

For the sake of completeness and clarity, it should be noted the MBMS Session Identity information element referred to above is different to the Temporary Mobile Group Identity (TMGI) and the MBMS Flow Identifier which are also used in association with MBMS services. TMGI is used to identify the MBMS Bearer Service whilst the MBMS Flow Identifier is used to distinguish between different sub-sessions of an MBMS user service. The sub-sessions represent location dependent content for a given user service, e.g. local news services could be distinguished by different MBMS Flow identifiers. The MBMS Session ID referred to above is used to identify specific content. For example, suppose there is a news programme broadcast at 12 o'clock and repeated at hourly intervals until it is replaced by an updated programme broadcast at 6 o'clock. In this case the 12 o'clock broadcast and 6 o'clock broadcast would have different MBMS Session IDs, but potentially the same TMGI and MBMS Flow Identifier.

Having described a specific example implementation, some aspects of embodiments of the invention are now summarised.

Thus, in accordance with embodiments of the invention such as described above, there is provided a concept of MBMS data caching in a relay node. A content provider may inform a BM-SC of services (or sessions) with content that may be cached (i.e. subject to repeated transmissions). It is foreseen that both MBMS services and individual sessions that within a service may be identified as cache-compatible.

Based on information received from a content provider, the BM-SC may include some form of indicator (which may be referred to as a "Content Cache Flag") which informs downstream nodes in the network of sessions that are cache-compatible. In the example described above with reference to FIGS. 2 and 3, the Content Cache Flag is implicitly signalled by the presence of a Session ID (Common MBMS Session Identifier). In other examples an explicit Content Cache Flag could be included in an extended "Session Start Request" message along with other attributes such as MBMS Service Area, Session Identifier and estimate duration etc.—see, for example, ETSI TS 123 246 [2]).

Each repeating MBMS session has a "Common MBMS Session Identifier" which is available to both the application layer and, in reduced form, to the radio access network (RAN). In principle it is possible for this reduced form of two distinct Common MBMS Session Identifiers to appear as the same Session ID at the RAN level. To avoid this the BM-SC may in some examples be configured to manage the assignment of Common MBMS Session IDs to ensure clashes occur at the reduced form level. As described above, in example embodiments it is proposed the Content Cache Flag corresponds to this common session ID. To allow the re-use of session IDs, they may be associated with an expiry indicator, e.g. to allow network elements to determine a time after which a session ID is to be treated as being associated with a new transmission rather than a repeat of a previous transmission. Another mechanism for doing this could be to include additional signalling in association with the use of a session ID to indicate to network elements whether the session ID is being used to link to a repeat of a previous transmission, or whether it is being re-used afresh for a new transmission (i.e. any cached versions of the data associated with that specific session ID are no longer valid).

In accordance with embodiments of the invention, data associated with a repeat session is still distributed by the BM-SC to downstream nodes in the network (i.e. the BM-SC has no knowledge of which network elements, if any, successfully cached the session data content).

In order to facilitate the process of caching data in a mobile network, e.g. in relay node(s), a file size indication could be provided to downstream nodes in association with the data to allow network elements to determine if they have sufficient storage resources to cache the session data. Currently, a conventional MBMS Session Start Request message includes an estimated session duration and desired required QoS (Quality of Service), and in some example implementation these can be used to estimate an associated file size if the data are cached. In other examples a separate indication of the amount of data for caching associated with a session might be provided.

As explained above, caching in relay nodes may be controlled by additional functionality in donor base stations. The additional functionality is schematically described above as being provided by a functional unit referred to as a MBMS cache controller (MCC). However, in general, this will not be a distinct physical element of the base station, but will be functionally provided by appropriate configuration of the base stations' normal control functions, for example, by suitable programming of a base stations control unit. For the relay node(s) served by a base station, the corresponding MCC may thus maintain a record of common MBMS session IDs and whether the relay node(s) have reported successful caching of the associated data. If all relay nodes subordinate to a given base station have successfully cached the content data for a given session ID, the MCC can decide not to forward the session user-plane data over the Un. If only some relay nodes subordinate to a given base station have successfully cached the content data for a given session ID, the MCC can decide not to forward the session user-plane data over the Un to these relay nodes, for example where content is delivered over Un using unicast techniques.

In accordance with embodiments of the invention, an MCC may be configured to examine information contained in session start request messages distributed by the BM-SC, and relay nodes may also examine this data, for example to monitor the session ID associated with an upcoming transmission. In accordance with some wireless telecommunications systems, this information is primarily available at the application layer, meaning the MCC and relay nodes may potentially need access to the application layer to extract the desired information. If for some reason this requirement is considered undesirable in a given implementation, additional dedicated signalling information could be used to provide the desired info nation (e.g. corresponding to session ID information) at the RAN level.

After data associated with an MBMS session have been transferred to a relay node, the relay node may convey to the MCC (for example using dedicated signalling) whether it has successfully cached the session data to allow the MCC to maintain the record of relay nodes that have successfully cached the session so that the MCC can decide whether or not to re-deliver the session data to relay nodes over the Un link when it is next repeated.

When user-plane data for sessions to be repeatedly transmitted have been successfully cached by relay nodes served by a donor base station (donor eNB), the base station's MCC can determine that the data does not need to be re-delivered to the relay nodes in advance of a subsequent re-transmission. However, it can be advantageous in MBSFN implementations for the relay node to be able to replay data content from its cache for a subsequent re-transmission in synchronization with transmissions from the rest of the network. In accordance with some embodiments of the invention this may be facilitated by the MCC stripping out the SYNC protocol headers (see ETSI TS 125 446 [3]) from the user-plane traffic associated with repeat transmissions, and forwarding these to the relay node. (It may be noted existing 3GPP LTE standards allows for the transmission of SYNC headers without session data). The relay nodes may thus apply the SYNC header information received from the base station to the content date retrieved from the cache, and transmit the data at the appropriate time and with the appropriate synchronisation based on the synchronisation information received from the base station. If a donor base station delivers SYNC headers without user plane data for repeated transmission in this way, there are various ways in which the relay node can associate the received SYNC headers with the correct stored content. For example, explicit signalling may be used to associate the SYNC with an identifier for the stored content (e.g. an MBMS Session ID). Another way would be to simply align the first received SYNC header associated with a repeat transmission with the first header stored in the cache from a previous transmission.

In accordance with some wireless telecommunications systems a BM-SC is responsible for generating SYNC headers for transmission sessions. Thus in accordance with some embodiments, such as described above, a BM-SC may be configured to generate the same SYNC headers for repeated sessions. The relay nodes may thus store SYNC information associated with an initial transmission and re-use this for subsequent transmissions of data retrieved from the cache. Synchronization at the physical layer can be achieved using any conventional mechanism for obtaining physical layer synchronization across network elements (e.g. base stations and relay nodes). In some embodiments operations and maintenance procedures may be used to define a mapping between SYNC relative timing information and absolute network time.

For the case when more than one relay node is served by a given donor base station, there is a possibility that some relay nodes will have successfully cached session data for a given service while some will not. When the service is next repeated (i.e. the data is to be retransmitted), and if it is desired for all relay nodes to take part in the repeat transmission, the MCC can instigate re-delivery of the session data to the relay node(s) that have not previously cached the data content. However, it is envisioned that user-plane MBMS data may be transported from a base station to multiple relay nodes over the Un interface using point-to multi-point techniques (that is to say using shared channels over the Un). In this, all relay nodes can receive the retransmission of session data, even those that might have already successfully cached the data content from a previous delivery. For relay nodes that have previously successfully cached the relevant data, the relay node can either retrieve the data from its cache or use the feed from the Un as the source for data to be transmitted during the repeat transmission. Using data from the cache in these circumstances may be considered preferable as it can provides protection against unexpected errors on the Un link.

It will be appreciated that where the above description has referred to broadcast services, the same principles apply equally to multicast services. Accordingly, references herein to "broadcast" services (and related terminology, such as "broadcasting") should be interpreted as including "multicast" services (and related terminology, such as "multicasting"), unless the context demands otherwise.

It will further be appreciated that various modifications can be made to the embodiments described above without departing from the scope of the present invention as defined in the appended claims.

For example, although embodiments of the invention have primarily been described with reference to an LTE mobile radio network, it will be appreciated that the present invention can be applied to other forms of network such as GSM, 3G/UMTS, CDMA2000, WiMax, etc. (to the extent relay nodes might be incorporated in such networks). Furthermore, although the term base station has been used interchangeably with eNodeB it should be understood that there is no difference in functionality between these network entities.

Thus, methods and apparatus for transmitting data to terminal devices in a wireless telecommunications system have been described. The data may be user-plane data associated with a repeating Multimedia Broadcast/Multicast Services (MBMS) session which is to be transmitted using MBMS over a Single Frequency Network (MBSFN) techniques in a network comprising at least one relay node supported by a donor base station. The scheme involves delivering the data from the base station to the relay node in advance of a scheduled transmission to terminal devices at a first time, and transmitting the data from the relay node to a terminal device at the first time. The relay node is further arranged to store the data in a cache. The relay node may then retrieve the data from the cache in advance of a scheduled transmission to terminal devices at a second time, and transmit the retrieved data to a terminal device at the second time. Thus the relay node is able to play a role in supporting a repeated MBSFN transmission at both a first time and a second time, while only receiving data from the base station once. This saves on the resources that would otherwise be used in delivering data for subsequent transmission from the base station to the relay node.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] ETSI TS 122 246 V10.0.0 (2011-05)—Digital cellular telecommunications system (Phase 2+); Universal Mobile Telecommunications System (UMTS); LTE; Multimedia Broadcast/Multicast Service (MBMS) user services; Stage 1

[2] ETSI TS 123 246 V10.1.0 (2011-06)—Universal Mobile Telecommunications System (UMTS); LTE; Multimedia Broadcast/Multicast Service (MBMS); Architecture and functional description

[3] ETSI TS 125 446 V10.1.0 (2011-07)—Universal Mobile Telecommunications System (UMTS); MBMS synchronisation protocol (SYNC)

The invention claimed is:

1. A method of transmitting data to a plurality of terminal devices in a wireless telecommunications system comprising a base station and a relay node for the base station, the method comprising:
   transmitting the data from the base station to the relay node;
   transmitting, at a first time, the data from the relay node to a first terminal device of the plurality of terminal devices;
   storing the data in a cache at the relay node;
   conveying, by the base station to the relay node, an indication that the relay node should retrieve the data from the cache; and
   retrieving, by the relay node in response to the indication, the data from the cache at the relay node and transmitting, at a second time after the first time in response to the indication, the data from the relay node to a second terminal device of the plurality of terminal devices, wherein
   the indication further indicates that the relay node should transmit the data at the second time.

2. The method of claim 1, wherein the data is user plane data associated with a multimedia broadcast multicast service (MBMS).

3. The method of claim 1, further comprising transmitting the data from the base station to the first terminal device at a same time as transmitting the data from the relay station to the first terminal device.

4. The method of claim 1, further comprising conveying a cache status indicator from the relay node to the base station to indicate whether the data have been successfully stored in the cache.

5. The method of claim 4, further comprising storing at the base station a record based on the cache status indicator received from the relay node.

6. The method of claim 4, further comprising re-transmitting the data from the base station to the relay node when the relay node does not convey the cache status indicator that indicates that the data have been successfully cached at the relay node.

7. The method of claim 4, further comprising associating the data with a data identifier.

8. The method of claim 7, wherein the data identifier is a MBMS session ID.

9. The method of claim 1, wherein the base station conveying the indication to the relay node is performed by the base station in response to the base station receiving a corresponding session start indicator originating from another network element.

10. The method of claim 1, further comprising associating the data with a session expiry indicator, wherein
   the retrieving the data from the cache and the transmitting the data from the relay node to the second terminal device at the second time is conditional on a value of the session expiry indicator.

11. The method of claim 1, further comprising storing synchronisation information associated with the transmission of the data from the relay node to the first terminal device at the first time in association with the data stored in the cache, wherein
   the relay node takes into account the stored synchronisation information when transmitting the data to the second terminal device at the second time.

12. The method of claim 1, further comprising transmitting synchronisation information to be used for transmitting the data from the base station to the relay node.

13. The method of claim 1, further comprising conveying to the relay node an indication of the amount of data to be transmitted.

14. The method of claim 1, further comprising:
   transmitting the data from the base station to a second relay node;
   transmitting the data from the second relay node to a third terminal device at the first time;
   storing the data in a second cache at the second relay node; and
   retrieving the data from the second cache and transmitting the data from the second relay node to a fourth terminal device at the second time.

15. A network for transmitting data to a plurality of terminal devices in a wireless telecommunications system, the network comprising:
   a base station; and
   a relay node for the base station, the relay node including a cache, wherein
   the base station is configured to transmit the data to the relay node,
   the relay node is configured to
      transmit, at a first time, the data to a first terminal device of the plurality of terminal devices, and
      store the data in the cache,
   the base station is further configured to convey, to the relay node, an indication that the relay node should retrieve the data from the cache and transmit the data at the second time, and
   the relay node is configured to retrieve, in response to the indication, the data from the cache and transmit, at a second time after the first time in response to the indication, the data to a second terminal device of the plurality of terminal devices.

16. The network of claim 15, wherein the data is user plane data associated with a multimedia broadcast multicast service, MBMS.

17. The network of claim 15, wherein the base station is configured to transmit the data to the first terminal device at a same time as the relay node transmits the data to the first terminal device.

18. The network of claim 15, wherein the relay node is configured to convey a cache status indicator to the base station to indicate whether the data have been successfully stored in the cache.

19. The network of claim 18, wherein the base station comprises a memory configured to store a record based on a cache status indicator received from the relay node.

20. The network of claim 18, wherein the base station is configured to re-transmit the data from the base station to the relay node when the relay node does not convey the cache status indicator that indicates that the data have been successfully cached at the relay node.

21. The network of claim 18, wherein the base station and relay node are configured to associate the data with a data identifier used to identify the data.

22. The network of claim 21, wherein the data identifier is a MBMS session ID.

23. The network of claim 15, wherein the base station is configured to convey the indication to the relay node indicating the data should be transmitted at the second time in response to the base station receiving a corresponding session start indicator originating from another network element.

24. The network of claim 15, wherein the relay node is configured to associate the data with a session expiry indicator and is configured to retrieve the data from the cache and transmit the data to the second terminal device at the second time in dependence.

25. The network of claim 15, wherein the relay node is further configured to store synchronisation information associated with transmission of the data to the first terminal device at the first time in association with the data stored in the cache, and is further configured to take account of the stored synchronisation information when transmitting the data to the second terminal device at the second time.

26. The network of claim 15, wherein the base station is configured to transmit synchronisation information to the relay node be used for the transmission of the data at the second time.

27. The network of claim 15, wherein the base station is configured to transmit to the relay node an indication of the amount of data to be transmitted.

28. The network of claim 15, further comprising a second relay node for the base station, wherein
the second relay node comprises a second cache,
the base station is further configured to transmit the data to the second relay node, and
the second relay node is configured to
transmit the data to third terminal device at the first time,
store the data in the further cache, and
retrieve the data from the second cache and transmit, at the second time, the data to a third terminal device.

29. A method of operating a relay node for a base station for transmitting data to a plurality of terminal devices in a wireless telecommunications system, the method comprising:
receiving, by circuitry of the relay device, the data to be transmitted from the base station;
transmitting, by the circuitry at a first time, the data to a first terminal device of the plurality of terminal devices;
storing the data in a cache of the relay node;
receiving an indication, from the base station, that the relay node should retrieve the data from the cache and transmit the data at a second time after the first time;
retrieving, in response to the indication, the data from the cache; and
transmitting, at the second time in response to the indication, the data to a second terminal device of the plurality of terminal devices.

30. The method of claim 29, wherein the data is user plane data associated with a multimedia broadcast multicast service, MBMS.

31. The method of claim 29, further comprising conveying a cache status indicator to the base station to indicate whether the data have been successfully stored in the cache.

32. The method of claim 31, further comprising receiving, by the circuitry, a re-transmission of the data from the base station when the relay does not indicate to the base station the data have been successfully cached.

33. The method of claim 31, further comprising associating the data with a data identifier.

34. The method of claim 33, wherein the data identifier is a MBMS session ID.

35. The method of claim 29, further comprising associating the data with a session expiry indicator, wherein
the retrieving the data from the cache and the transmitting the data to the second terminal device at the second time is conditional on a value of the session expiry indicator.

36. The method of claim 29, further comprising storing synchronisation information associated with the transmission of the data to the terminal device at the first time in association with the data stored in the cache, and taking account of the stored synchronisation information when transmitting the data to the second terminal device at the second time.

37. The method of claim 29, further comprising receiving synchronisation information from the base station to be used for the transmission of the data at the second time.

38. The method of claim 29, further comprising receiving from the base station an indication of the amount of data to be transmitted.

39. A relay node for a base station for transmitting data to terminal devices in a wireless telecommunications system, the relay node comprising:
a cache; and
processing circuitry configured to
receive the data to be transmitted from the base station,
transmit the data, at a first time, to a first terminal device of the plurality of terminal devices,
store the data in the cache,
receive an indication, from the base station, that the relay node should retrieve the data from the cache and transmit the data at a second time after the first time,
retrieve, in response to the indication, the data from the cache, and
transmit, at the second time in response to the indication, the data to a second terminal device of the plurality of terminal devices.

* * * * *